Feb. 26, 1957 J. T. KUNZ 2,783,049

AUTOMATIC RECORD PLAYER

Filed Dec. 23, 1949 4 Sheets-Sheet 1

INVENTOR.
JACOB T. KUNZ
BY
Hammond & Littell
ATTORNEYS

Feb. 26, 1957 J. T. KUNZ 2,783,049

AUTOMATIC RECORD PLAYER

Filed Dec. 23, 1949 4 Sheets-Sheet 2

INVENTOR.
JACOB T. KUNZ
BY
Hammond & Littell
ATTORNEYS

Feb. 26, 1957 J. T. KUNZ 2,783,049

AUTOMATIC RECORD PLAYER

Filed Dec. 23, 1949 4 Sheets-Sheet 3

INVENTOR.
JACOB T. KUNZ
BY
Hammond & Littell
ATTORNEYS

INVENTOR.
JACOB T. KUNZ
BY
Hammond & Littell
ATTORNEYS

United States Patent Office 2,783,049
Patented Feb. 26, 1957

2,783,049

AUTOMATIC RECORD PLAYER

Jacob T. Kunz, North Hills, Pa., assignor to Schulmerich Electronics, Incorporated, Sellersville, Pa., a corporation of Pennsylvania Application December 23, 1949, Serial No. 134,683

5 Claims. (Cl. 274—10)

This invention relates to automatic record changing and playing devices and particularly to an automatically operable arrangement controlled by a program mechanism such as a program clock apparatus.

Record players or phonographs are well-known having a rotatable turn-table for supporting a mechanically grooved or similar disc-like record, there being a playing or tone arm holding the pick-up or transducer means. In conjunction with such a turn-table, various types of record changing means have been devised wherein a stack of records is held over the turn-table and automatically fed to the turn-table in timed relationship with movement of the tone arm. Such a record changer normally will have a record changing cycle mechanism for appropriately moving the various related elements. In conventional players and records, a spiral groove is cut at the end of the record for imparting a greater radial velocity to the tone arm than during playing so as to actuate the change cycle mechanism. Such energization will cause the tone arm to be lifted and moved rapidly radially outwardly clear of the records, the next record to be dropped on to the turn-table and then the tone arm to be engaged with the next record, thereby completing the change cycle. In some devices, the player stops after the last record has been played.

One of the objects of the present invention is to provide a record changer and playing mechanism arranged so that it cannot be stopped at any point except when the tone arm or transducer is in the change cycle, for example, after it is in operative contact with the record.

In all of these, if the player is stopped while the tone arm is playing and is then restarted, a disagreeable noise will occur as the record is stopped or as it is started, because of the change in speed of the record. It is essential that the record operate at constant speed.

None of the known player arrangements described have means for preventing stopping of the record except when the changer is in the change cycle, together with the other features of this invention.

The apparatus is of particular value for use in systems which are automatically started at predetermined intervals during the day or night by a program clock or similar mechanism.

In such a system, the record player can be connected with suitable amplifiers which in turn are connected to a loud speaker located in a building, or exteriorly of the building, such as in a church tower. Merely by way of example, chime or bell music can be recorded on the record and the bell music reproduced in the tower loud speaker at predetermined times during the day.

In a rotating turn-table type or record changer, there is inertia to starting always present in the turn-table and other related parts and this is not constant because of the varying number of records which may be thereon. The turn-table must be brought up to speed before the tone arm or transducer engages the same or otherwise a disagreeable and undesirable beginning tone will be heard. This is because the music is arranged to be reproduced at a predetermined speed of the turn-table and if the speed is other than that, various undesirable effects will result. Thus, the arrangement, in an automatic system, should be one wherein it is impossible, except by cutting off of the main power supply, to actuate the various controls in such a manner as to permit stopping of the tone arm in the middle of the record or on the record so that upon the next automatic starting thereof, the aforementioned undesirable sound results.

Another of the objects of the invention is to insure that the turn-table will be rotating at proper speed when the transducer contacts the record.

In the preferred aspect, the motor preferably should have a starting torque increasing means operable at the time of starting so as to increase the torque for a limited predetermined time, which can be accomplished by arrangements for impressing a higher voltage on the motor at starting. The actuating means governing the predetermined time should operate independently of the rotating means so that it will be impossible for the higher voltage or current impressed upon the motor for starting purposes to damage the motor or to create a fire hazard. The starting torque means may take various forms as will be described hereinafter.

The aforementioned systems, preferably should have arrangements so that the records can be started or changed by means other than the program clock, such as by a manual switch and such that the record being played can be rejected and the next one placed on the table by the automatic changer.

Another object of the invention is to provide a single switch mechanism for controlling starting torque and also the stopping point only in the change cycle.

These and other objects, advantages, and features will become apparent from the following description and drawings which are merely exemplary.

Figure 1:
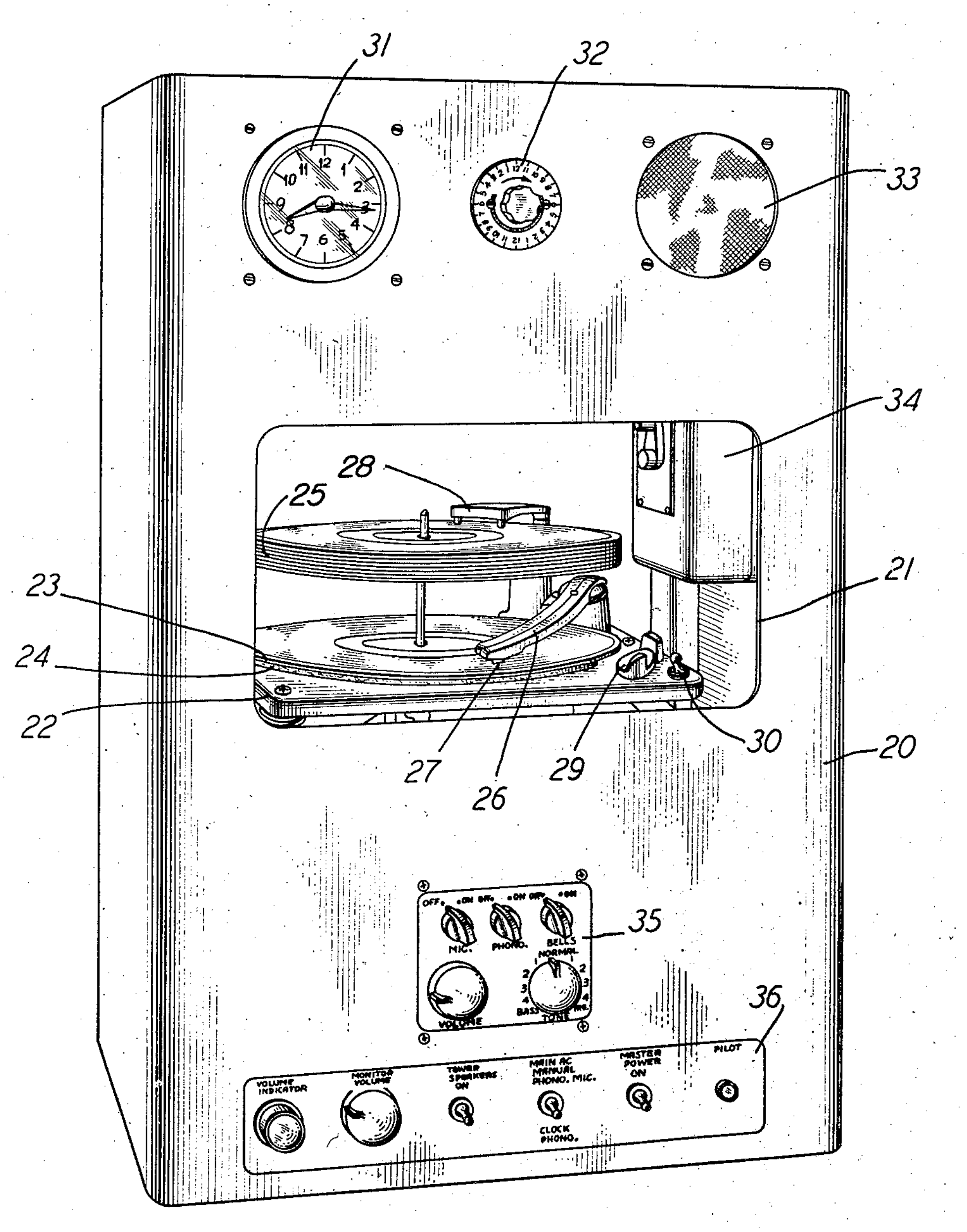
Figure 1 is a perspective view of one form of cabinet containing the invention.
Figure 2:
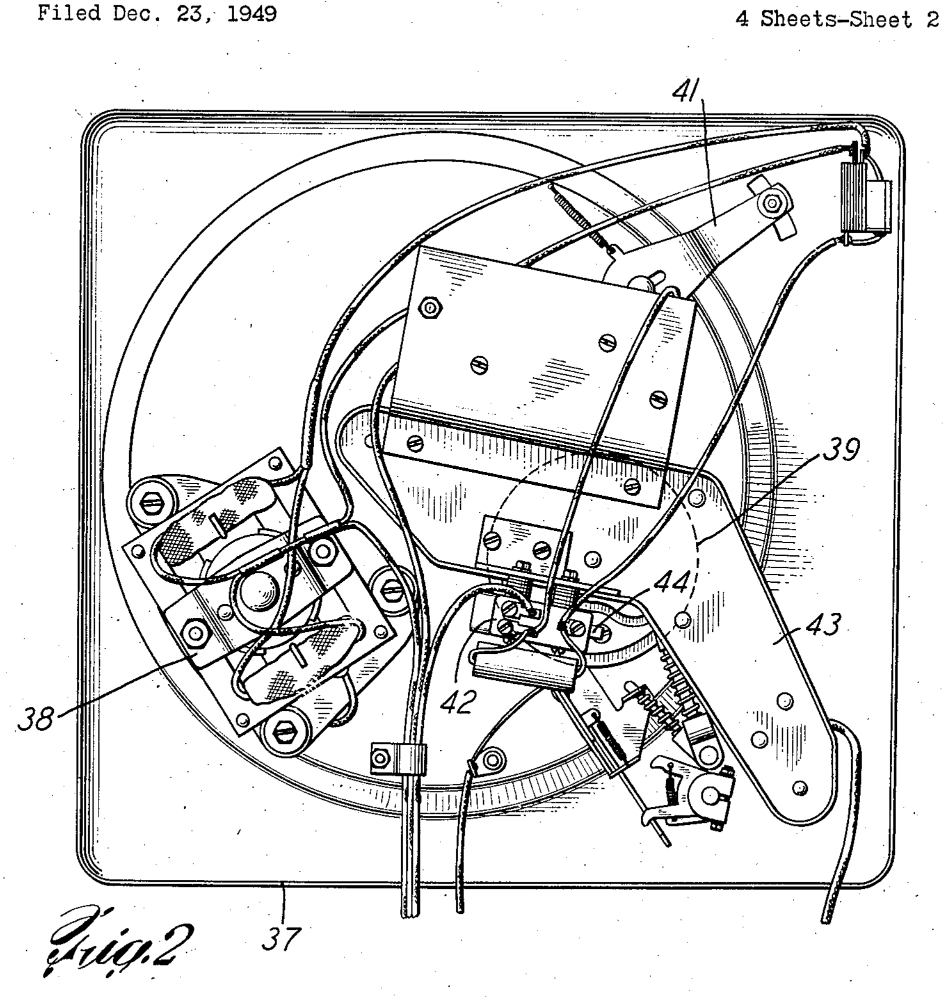
Figure 2 is a fragmentary bottom view of one form of record player.
Figure 3:
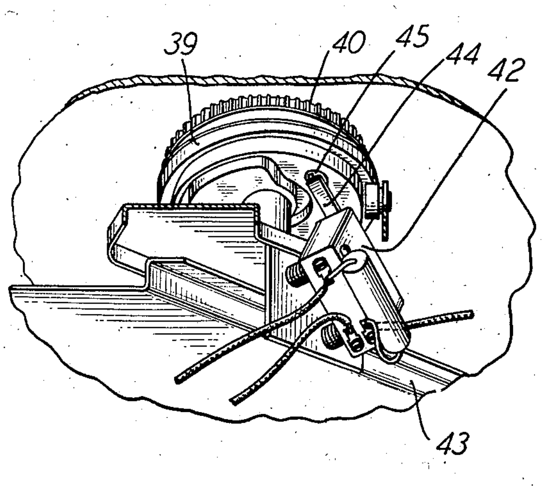
Figure 3 is a fragmentary perspective view of a portion of the change cycle mechanism of Figure 2.

The invention can be applied to various record player arrangements, one being illustrated in Figures 1, 2, and 3. Case 20 may be of any suitable type having an aperture 21 providing access to the record changer generally indicated at 22. The record changer is illustrated with a record 23 on turn-table 24, there being a stack 25 of records yet to be played. Tone arm 26 carrying a suitable transducer or pick-up arrangement 27 is illustrated in place on the record, it being assumed that the record is turning and the device operating. Record feed devices 28 are provided for the purpose of feeding the next record on the turn-table 24 at appropriate times, such being operated by the changer cycle mechanism, upon completion of the playing of the record on the turn-table, and after the tone arm 26 has been moved to the right, and out of the way of the next record.

During the playing of the record, the change cycle operating mechanism normally is inoperative as will be described hereafter. Conventionally, at the end of the record, the players are arranged so that the tone arm is moved relatively faster inwardly than when it is playing the record so as to initiate movement or actuation of the change cycle mechanism, constituting normally the beginning of the change cycle.

Cam elements lift the tone arm above the record and move it outwardly and beyond the circumference of the turn-table, at which time, the change cycle mechanism drops the next record on to the turn-table. Following this, the tone arm is moved over to an initial position in readiness for movement on to the next record, and if the record player continues operation, at which time the change cycle is complete, will engage the next record. In the present apparatus, the change cycle mechanism is arranged so that the tone arm will be stopped and power shut off before completion of the change cycle so that the tone arm is poised over the record in readiness for the next playing operation. It is to be understood, that various types of change mechanism, records and playing devices can be used.

A rejection lever 29 (Fig. 1) operating lever 41 (Fig. 2) can be provided on the record changer frame for the purpose of initiating the change cycle before the playing of a record has been completed, or to cause the change cycle mechanism to function. Also a manual or clock switch 30, which will be described hereafter, is provided on the changer frame. A suitable 12 hour clock 31, and 24 hour clock 32, also can be mounted on cabinet 20. Preferably, a speaker 33 is adjacent the cabinet for monitoring the playing arrangement. A totalizer or timer for playing more than one record is illustrated at 34 and the various controls, switches, and elements at 35 and 36. Conventional amplifiers and power supplies can be located in the cabinet. The main loud speaker can be located if desired in the tower of a church, in an auditorium, or otherwise.

The amplifier circuit also can be arranged to play records, to have a microphone connected therewith, or to have bell instrument devices connected therewith so as to produce bell tones in the loud speakers.

In the particular circuit to be described, parts of the record player mechanism are illustrated in Figures 2 and 3 wherein changer frame 37 has a usual motor 38 and a change cycle mechanism cam drum 39 mounted thereon. The drum is driven by means of gear 40 from the turn-table in a conventional manner, there being a clutch connecting the gear 40 and the drum 39, said clutch being operable as needed for operation of the drum. Drum 39 has cam elements thereon for actuating the various levers in conjunction with record changing and tone arm movement. Reject lever 41 also is employable for the purpose of engaging the clutch of gear 40 with the cam drum 39 so as to start the change cycle operating mechanism.

For purposes which will be described hereafter, change-run switch 42 can be mounted in some suitable manner on bracket 43, said switch preferably being of the snap-acting type, such as one sold under the name "Micro-Switch." The operating arm 44 cooperable with said switch is arranged to contact the switch button operating the switch mechanism, said lever 44 being engageable with a cam or raised member 45 on the cam drum or otherwise mounted on the change cycle mechanism.

When raised member or cam 45 contacts lever 44, the switch is arranged to be operated for the purpose which will be described in conjunction with the detailed description of the wiring circuits. One of the purposes of switch 42 is to connect the circuits so that the record player can be stopped only in the change cycle or before the tone arm is again placed on the record and the record player started in operation to play a record.

Figure 4:
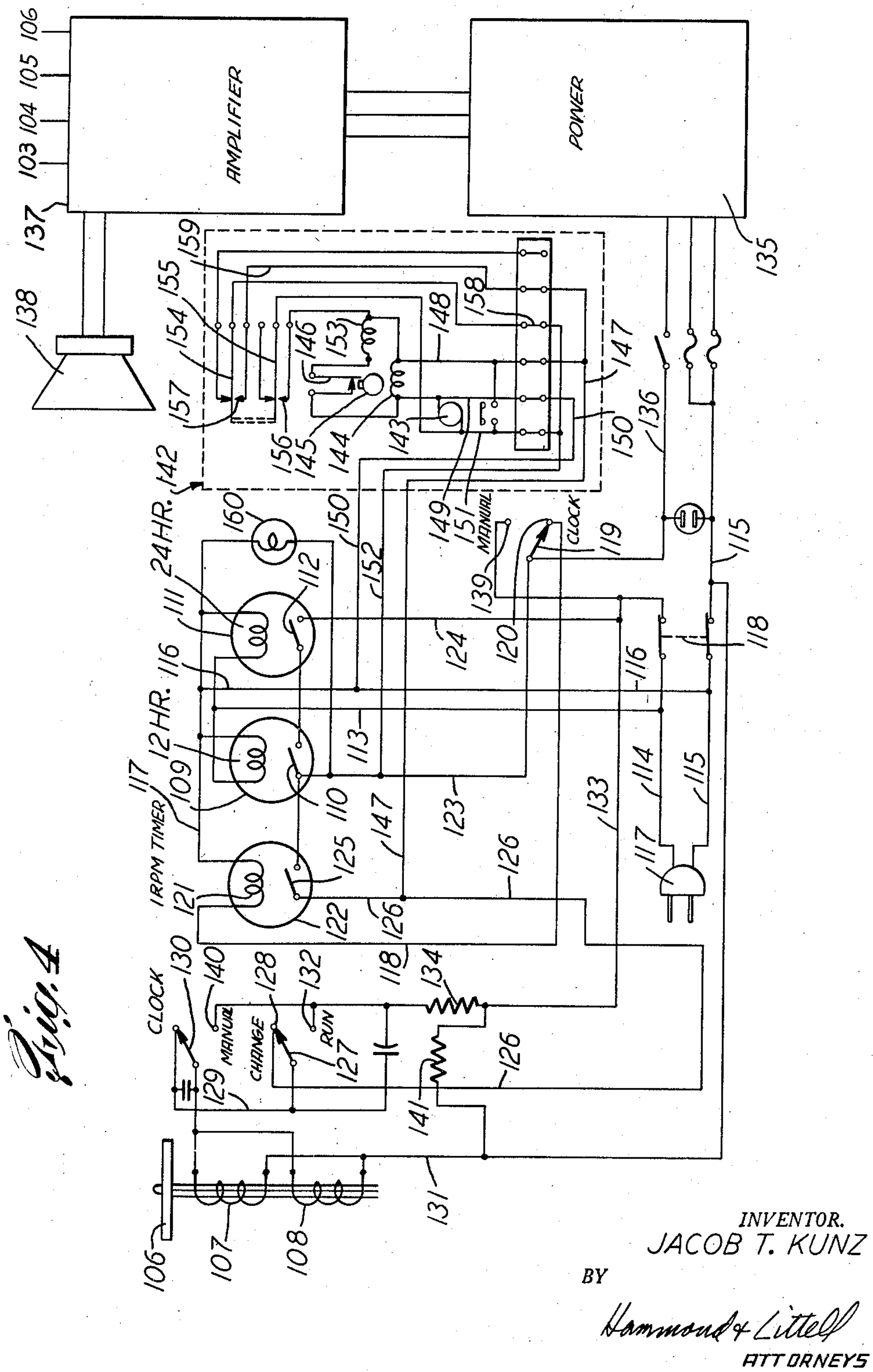
Figure 4 is a wiring diagram of one circuit containing the invention.

Reference may be made to Figure 4 showing a preferred wiring diagram wherein the power supply is indicated schematically by box 135 and the amplifiers by box 137, loud speaker 138 being suitably connected with the amplifiers. The amplifier circuit may have provisions for connecting a microphone thereto at 104, a phonograph or record player at 103 or any other source of undulating energy at 105, such as the vibrations of a bell instrument.

The control for the phonograph motor in conjunction with the clocks is first illustrated where a standard 110 volt motor is employed and the windings cut in half and connected in parallel so that in effect, two 55 volt windings are employed. The switching circuits about to be described are arranged so that at starting, full line voltage can be connected across the two windings of the phonograph motor, thus giving the motor a substantial increase in starting voltage. After the phonograph has been started, the line voltage can be connected to the windings through suitable voltage reducing means.

In Figure 4, turn-table 106 has windings 107, 108 for rotating the same, said windings being 55 volt windings, it being understood that other voltages can be used. A 12 hour program clock is indicated at 109, said clock having suitable pins or similar operating mechanism for closing switch 110 at predetermined intervals or times.

In one form of the invention, the clock can be arranged to hold switch 110 closed for a 15 minute period. A second timer or clock 111 has switch 112 in series with switch 110. Clock 111 is a 24 hour or other suitable interval clock arranged so that it closes switch 112 for a portion of the day and opens it for another portion. Thus, it will select which portion of the day the 12 hour clock program can energize the various circuits.

The operating windings of clocks 111 and 109 are arranged so that they are connected through 113 to one side 114 of the power source, the other side of the clock windings being connected to the other side of the power source 115 through lead 116. Thus, whenever the instrument has power connected thereto at 117, the 12 hour and 24 hour clocks will operate. Master power switch 118 can be employed, if desired, to furnish power to the various circuits.

Assuming switches 119 and 130 are set for clock operation and that timers 109 and 111 have closed their switches, the winding 121 of the one R. P. M. timer 122 is energized through lead 116, lead 117, lead 118, switch contact 120, switch 119, lead 123, closed switch 110, closed switch 112, lead 124, to line 114. The one R. P. M. timer mechanism may be of any suitable type such as one having a winding and rotor movable to a stall point at the end of one R. P. M. A cam, not shown, connected with the rotor is used to close switch 125 at the end of about 50 seconds after starting of timer 122. The cam then maintains switch 125 closed for about 5 seconds. The timer then runs for three or four more seconds after opening switch 125 whereupon the timer stalls. Closing of switch 125 will deliver a pulse from line 114 through switches 110 and 112 to the phonograph motor through lead 126, lead 126 being connected through the change cycle mechanism switch 127, contact 128, lead 129, switch 130, to the motor windings 107 and 108 which are in parallel. The common side of the motor windings is connected through lead 131 to power line 115.

Change cycle switch 127 (corresponding to switch 42, Figs. 2, 3) was moved into the change cycle position by the change cycle operating mechanism as previously described. The switch 130 (corresponding to switch 30, Fig. 1) can be located upon the changer frame, and is normally in the clock position as seen in the drawing when clock control is to be used. Full voltage thus is directly applied to the windings 107 and 108 in parallel for starting purposes.

When the 5 second starting period is over with, the change cycle is completed and the record has started to play and change cycle switch 127 has been moved to run contact 132. When in the run position, power is delivered to the motor windings from lead 114 through lead 133, resistor 134, contact 132, switch 127, lead 129, switch 130 to the windings, the other side of the windings being connected by line 131 with power lead 115. The windings thus are connected to the power source through a voltage dropping resistor 134 which serves to reduce the voltage applied to the windings. The resistor or other voltage reducing means can be chosen so that the voltage applied to the windings is that for which the windings were designed to run.

The record will continue playing until the end thereof, until the change cycle is initiated and the transducer moved to initial position ready for starting to play the next record, at which time switch 127 will be operated and will return to change contact 128, thus breaking the circuit from lead 133 to the motor windings and stopping the turn-table and mechanism.

When winding 121 of the one R. P. M. timer was first closed, a circuit also was completed to power supply 135 through lead 123 and lead 136. The power supply can be connected to a conventional amplifier 137 having the desired characteristics, which in turn is connected to a loud speaker 138 of any suitable design. Power is fed thereto from line 114, lead 124, closed switch 112, closed switch 110, line 123 to lead 136.

The clock 109 can be designed to keep the switch 110 closed for 15 minutes during which time the one R. P. M. timer remains energized. At the end of this time, clock 109 opens switch 110 and turns off the amplifier. At the beginning of the cycle, the amplifier was on for approximately 50 seconds before the turn-table was started, thus permitting the amplifier tubes to heat and become operative. When switch 110 opens, the timer 122 will reset itself.

When switch 119 is thrown to the manual position 139, power will be connected to the power amplifier arrangement. Then when switch 130 is thrown to the manual position or contact 140, power will be furnished through lead 133, resistor 134, contact 140, switch 130 to the motor windings, the changer having previously stopped in the change position so that switch 127 is in change position. Immediately after starting of the mechanism and when the changer moves out of the change cycle, switch 127 will be moved to the run side or on contact 132. The player changer will continue operating and playing records as long as the switch 130 is in the manual position. When switch 130 is moved to the clock position, the player will stop upon completion of the record being played when switch 127 is moved to the change position.

As is well-known in this type of player, a reject lever may be provided for the purpose of initiating a record changing operation, this being illustrated as previously mentioned at 29 (Fig. 1) and 41 (Fig. 2). In the particular record player under consideration, the last record will continue to play and will be repeatedly played.

When it is desired to stop the mechanism and switch 130 has been moved to the clock side, the motor receives its power through resistor 134, contact 132, switch 127, lead 129, and switch 130, and the motor will continue running until it reaches the change cycle stop position at which time switch 127 is moved to the change side 128, thus cutting off power to the motor and stopping the mechanism. A heater resistor at 141 is connected across the power supply source and can be used for the purpose of raising ambient temperature around the record player so that the lubricant of the various parts will be correct for playing purposes and there will not be an initial incorrect speed. This is of particular importance in an automatic type of record player where a program clock is used to control the same and the device may be located in a place of reduced temperature such as a room not ordinarily occupied at all times.

The circuit just described operates to play one record at a time, the player then stopping. At the end of the 15 minute or other period for which the clock is set, opening of switch 110 will remove power from winding 121 of the R. P. M. timer which will allow the timer to reset itself to zero position, this being accomplished by a conventional spring arrangement (not shown), deenergization of winding 121 permitting the spring to reset the timer.

In the event, it is desired to play more than one record, the plural record timing or totalizer apparatus shown in the dotted line box 142 can be employed, although such can be omitted. Motor 143 in plural record player timer 142 is connected by a clutch solenoid 144 with the cam actuator 145, cam actuator 145 being for the purpose of opening normally closed switch 146 at the end of the predetermined time for which the timer or totalizer 142 is set and during which time records are to be played. Upon energization of the circuits for initiating playing of a record as just described, closing of switch 110 will cause power to be furnished to motor 143 through lead 116, lead 150, lead 149, motor 143, lead 151, lead 152, switch 110, switch 112, lead 124, to the source of supply 114. Also upon closing of switch 125, power will be supplied from lead 126, lead 147, lead 148, clutch solenoid 144, lead 149, lead 150, lead 116 to supply line 115 to energize the clutch. Relay coil 153 also will be energized so as to move switch blades 154, 155, downwardly (Fig. 4) so as to close with contacts 157, and 156, respectively. Closing of contact 156 will provide a holding circuit for relay 153 to hold the same closed as long as switch 146 is closed. Closing of contact 157 will provide a source of energy for the phonograph motor regardless of the opening of switch 125 upon completion of the single revolution of the timer. This circuit is from power line 114, lead 124, closed switch 112, closed switch 110, lead 123, lead 152, terminal 158, blade 154, switch contact 157, lead 159, lead 147, lead 126, change cycle switch 127, to the phonograph windings. The plural record timer 142 will continue applying a pulse to the phonograph motor each time it returns to the change cycle as long as holding switches 155, 156 are closed. Upon opening of switch 146 by cam operator 145 after a predetermined adjustable time, current will be removed from relay 153 and thus no energy will be available when the change switch 127 next returns to change position. The phonograph then will continue running until switch 127 moves to the change cycle position at which time it stops. If desired, pilot light 160 can be provided as is known in the art.

It is seen that the circuit is arranged so that operation manually by switch 130 is such that the changer cannot be stopped except in the change cycle. The only way in which the changer can be stopped undesirably, would be by disconnecting from the main power supply as by the master switch. The latter can be located so that it cannot be reached readily or can be omitted, not being a control element.

Figures 5, 6, 7:
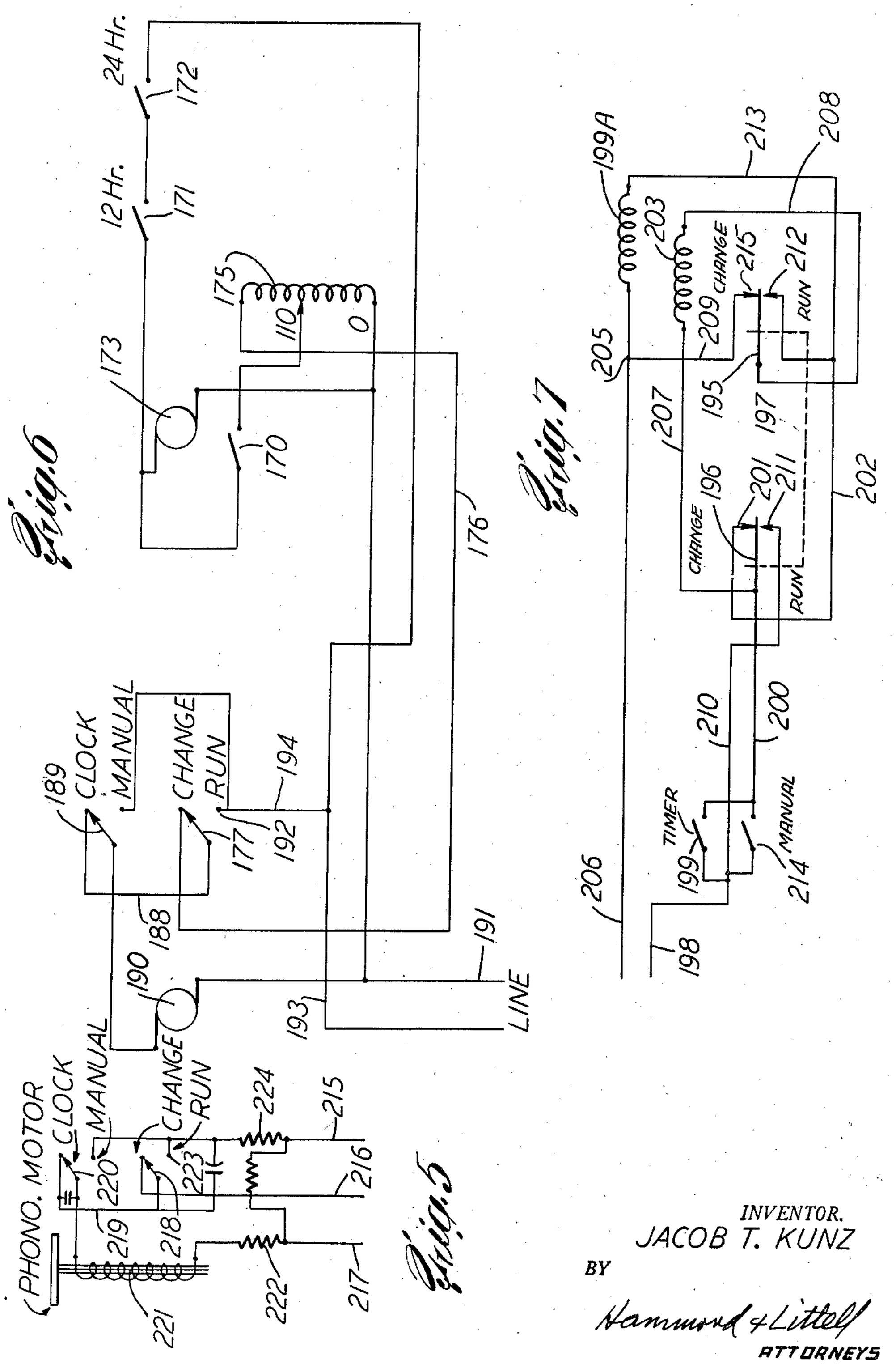
Figure 5 is a fragmentary wiring diagram of a modification of Figure 4.
Figure 6 is a fragmentary wiring diagram of another form of the invention.
Figure 7 is a fragmentary wiring diagram of a still further form of the invention.

The phonograph motor of Figure 4 also may be arranged so that a single winding is used and a pair of resistors employed, such being illustrated in Figure 5. Leads 215, 216 and 217 correspond to leads 133, 126 and 131 of Figure 4. Change switch blade 218 is seen in the change position corresponding to switch 127 of Figure 4. When the timer places a pulse on the motor, voltage will be supplied to the windings through lead 216, change switch blade 218, lead 219, switch blade 220, winding 221, resistor 222, line 217, which leads to one side of the source of supply. Winding 221 of the phonograph motor is constructed to operate at less than the voltage of the supply circuit so that the voltage applied thereto at starting can be considerably higher than that for which the winding is designed. In this manner, a high starting torque can be developed by the motor. Immediately after the change cycle again is initiated, as in the previous forms, switch 218 will be shifted to run contact 223, so that power is supplied from line 215 through resistor 224, contact 223, switch blade 218, lead 219, winding 221, and resistor 222. In the run position, both resistor 222 and 224 will be in series with the supply. The resistor 224 is chosen so as to reduce the voltage to the motor winding 221 to that for which it is designed for continuous operation, motors being capable of withstanding short periods of higher voltage than normal. Upon completion of the playing cycle and just before the end of the change cycle, switch blade 218 will be shifted to the change position so as to stop the motor as described for Figure 4. The double resistor arrangement of Figure 5 also can be used in the form illustrated in Figure 4.

Another form of circuit is illustrated in Figure 6, said circuit being useable in place of the control circuit of Figure 4, for producing a high starting torque of predetermined time, certain of the parts and connections being omitted in the interests of clarity. In this particular form, an auto-transformer is employed for the purpose of giving a short period of increased voltage on the motor. The switches actuated by the 12 hour clock, 24 hour clock and 1 R. P. M. timer switches are indicated diagrammatically at 170, 171 and 172. Upon closing of the 12 hour timer switch 171, the 1 R. P. M. timer 173 will be started and at the end of 50 seconds will close timer switch 170 for a 5 second pulse as described for Figure 4. This will cause a pulse of higher voltage than the line to be delivered through the medium of the auto-transformer 175 through lead 176 from the auto-transformer, change cycle switch 177, lead 188, switch 189, motor 190, back to power line 191. Upon starting of the motor, change cycle switch 177 will be moved to the run side or contact 192. This will serve to change the voltage supply from lead 176 to lead 193. This will be through lead 193, lead 194, contact 192, switch 177, lead 188, switch 189 and to motor 190. The arrangement will continue operating until the change cycle switch 177 is opened just before the end of the change cycle. It is apparent that during the starting period, a higher voltage will be furnished by the auto-transformer to the phonograph motor and that immediately after starting, the lower line voltage will be fed thereto. The auto-transformer for example, can be arranged to supply 150 volts when a line voltage of 110 is used. In the form just shown, the normal winding of the phonograph motor can be used.

A still further alternative is illustrated in Figure 7 wherein interconnected switch blades 196 are used, said blades being connected together by an actuator 197 which is operable by the change cycle mechanism cam similar to 42 (Figure 2). A pair of motor windings is illustrated at 199A and 203, the one R. P. M. timer switch being shown at 199, the clock switches being omitted in order to simplify the description, said clock switches being operable to energize and close timer 199. Switch blades 195 and 196 are in contact with contacts 201 and 215, respectively, when the switches are in the change cycle position. Upon the closing of 199 for the 5 second pulse, power will be supplied from power line 198, timer switch 199, lead 200, switch blade 196, said switch blade being in contact with 201 when in the change cycle, contact 201, lead 202, winding 199A to common point 205 which in turn is connected to the other side of the power supply 206 to common point 205. Power also is supplied to the other motor winding in parallel with 199A through line 200, lead 207, winding 203, lead 208, switch 195, lead 209, contact 215, to the common point 205. Thus, when the switch is in the change cycle position, windings 199A and 203 are connected in parallel and thus full voltage 110 volts, impressed across each. When switches 195 and 196 move to the run position, windings 199A and 203 are connected in series. The circuit can be traced from power line 198, lead 210, contact 211, switch blade 196, lead 207, winding 203, lead 208, switch blade 195, switch contact 212, lead 213, winding 199A to the power supply 206. The windings then are in series and thus operate as conventional 110 volt windings. The arrangement in Figure 7 also can be started manually by operation of switch 214. In this instance, initiation by manual operation also will place a high voltage on the motors similar to the automatic operation.

The change run switch serves in one aspect of the invention both as a switch preventing stopping of the appaartus in any but the change cycle, and also serves as a switch which is operable to provide the voltage changes desirable for increased starting torque.

The invention may be used with various types of record changers and records. Also different types of motors and windings may be employed and variations made in the details of construction without departing from the spirit of the invention, except as defined in the appended claims.

What is claimed is:

1. In a program controlled record player system, the combination comprising record rotating means, a transducer engageable with said record, record changing means, change cycle operating mechanism connected with said transducer, and said record changing means, operable to disengage said transducer from a record, place a new record on said rotating means, and move said transducer to an initial position in readiness to play the next record, an electric circuit for said rotating means, a change cycle switch in said circuit operable by said change cycle operating mechanism into a change and run position, automatic starting means connectable to said change cycle switch when it is in the change position imparting starting energy to said player when desired, said starting means being connected to a source of energy, said switch being moved to a run position for supplying different level running energy to the rotating means after the player has started, said running energy being connected to a source of energy independent of the starting circuit, and means connected with said change cycle mechanism moving said switch to the change position and cutting off the connection to the source of energy only when the player is in the change cycle thereby stopping operation thereof in the change cycle only unless energy is supplied to the change switch when in the change position.

2. In a program controlled record player system, the combination comprising record rotating means, a transducer engaged with said record changing means, change cycle operating mechanism connected with said transducer, and said record changing means, operable to disengage said transducer from a record, place a new record on said rotating means, and move said transducer to an initial position in readiness to play the next record, an electric circuit connected with said rotating means, a single cycle switch in said circuit operable by said change cycle operating mechanism into change and run positions, automatic starting means connectable to said switch when in the change position imparting starting energy to said player when desired, said starting means being connected to a source of energy, said switch being moved to a run position for supplying running energy to the rotating means during running thereof, said running energy being connected to a source of energy independent of the starting energy, means connected with said change cycle mechanism moving said switch to the change position when the player is in the change cycle, stopping operation thereof in the change cycle unless energy is supplied to the change switch when in the change position, and a manually operable switch for connecting energy to said record rotating means in order to initiate manual operation of the record rotating means, the run position of the change cycle switch maintaining running energy to said rotating means when the change cycle switch is in run position, the change switch thereafter stopping the player only in the change cycle and when the manual switch is moved from its position in which manual operation was initiated.

3. In a program controlled record player system, the combination comprising record rotating maens, a transducer, record changing means, change cycle operating mechanism connectable with said transducer and said record changing means, operable to control said transducer, place a new record on said record rotating means, and move said transducer to an initial position in readiness to play the next record, an electric circuit connected to said rotating means, program clock means connected to said circuit for energizing the same at predetermined intervals, and means including a two position change cycle switch means in said circuit, said switch means being operable to a first position by the record changing mechanism when the record changing mechanism is changing records and to a second position by the record changing mechanism when the record changing mechanism is playing records, means connecting said change cycle switch when in the change cycle position to a circuit including said program clock means to furnish energy to start said record rotating means, said change cycle switch then being moved to run position, and means connecting said change cycle switch when in the run position to a source of energy for maintaining rotation of the rotating means until the switch is again moved to change position by the change cycle mechanism.

4. In a program controlled record player system, the combination including record rotating means, a transducer engageable with said record, record changing means, change cycle operating mechanism connected with said transducer, and said record changing means, operable to disengage said transducer from a record, place a new record on said rotating means and move said transducer to an initial position in readiness to play the next record, an electric circuit for said rotating means, a change cycle switch in said circuit operable by said change cycle operating mechanism into a change and run position, automatic starting torque increasing means connectable to said change cycle switch when it is in the change position imparting increased torque to said player for the duration of the time the change cycle switch is in the change position, said switch being connected to a source of energy when in the change position, said switch being moved to a run position for supplying normal running torque to the rotating means after the player has started, said switch being connected to a source of energy when in the run position, and means connected with said change cycle mechanism moving said switch to the change position when the player is in the change cycle, thereby stopping operation thereof in the change cycle only, unless energy is supplied to the change switch when in the change position.

5. In a program controlled record player system, the combination including record rotating means, a transducer engageable with said record, record changing means, change cycle operating mechanism connected with said transducer and said record changing means, operable to disengage said transducer from a record, place a new record on said rotating means, and move said transducer to an initial position in readiness to play the next record, an electric circuit for said rotating means, a change cycle switch in said circuit operable by said change cycle operating mechanism into a change and run position, voltage changing means connectable to said change cycle switch when it is in the change position applying at starting for the duration of the time the system is in the change cycle position and independent of the rotating means an increased starting torque to said player, said switch being connected to a source of energy for a limited time when in the change position, said switch being moved to a run position for supplying normal running torque to the rotating means after the player has started, said switch being connected to a source of energy when in the run position, and means connected with said change cycle mechanism moving said switch to the change position when the player is in the change cycle, thereby stopping operation thereof in the change cycle only, unless energy is supplied to the change switch when in the change position.

References Cited in the file of this patent

UNITED STATES PATENTS

| | | |
|---|---|---|
| 1,800,803 | Moore | Apr. 14, 1931 |
| 1,866,405 | Garcia | July 5, 1932 |
| 1,938,810 | Collison et al. | Dec. 12, 1933 |
| 1,944,090 | Lukens | Jan. 16, 1934 |
| 2,064,777 | Winchell | Dec. 15, 1936 |
| 2,137,276 | Erbe | Nov. 22, 1938 |
| 2,207,706 | Andrews | July 16, 1940 |
| 2,211,985 | Peters | Aug. 20, 1940 |
| 2,247,073 | Thompson | June 24, 1941 |
| 2,330,383 | Roe | Sept. 28, 1943 |
| 2,421,835 | Durant | June 10, 1947 |
| 2,627,415 | Rasmussen | Feb. 3, 1953 |